United States Patent
Su et al.

(10) Patent No.: US 8,306,355 B2
(45) Date of Patent: Nov. 6, 2012

(54) METHODS AND SYSTEMS FOR REDUCING COMPRESSION ARTIFACTS

(75) Inventors: Yeping Su, Camas, WA (US); Hao Pan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 714 days.

(21) Appl. No.: 12/502,087

(22) Filed: Jul. 13, 2009

(65) Prior Publication Data
US 2011/0007982 A1    Jan. 13, 2011

(51) Int. Cl.
*G06K 9/40* (2006.01)
(52) U.S. Cl. ........................... 382/274; 382/275
(58) Field of Classification Search .............. 342/28; 348/154, 155, 208.1, 352, 666; 358/3.26; 375/E7.19, E7.263; 382/236, 274, 275
See application file for complete search history.

(56) References Cited

U.S. PATENT DOCUMENTS

| | | | |
|---|---|---|---|
| 6,539,060 B1 | 3/2003 | Lee et al. | |
| 6,665,346 B1 | 12/2003 | Lee et al. | |
| 6,707,952 B1 | 3/2004 | Tan et al. | |
| 6,895,056 B2 | 5/2005 | Graley | |
| 6,950,473 B2 | 9/2005 | Kim et al. | |
| 6,983,079 B2 | 1/2006 | Kim | |
| 6,993,191 B2 | 1/2006 | Petrescu | |
| 7,003,173 B2 | 2/2006 | Deshpande | |
| 7,027,654 B1 | 4/2006 | Ameres et al. | |
| 7,027,661 B2 | 4/2006 | Estevez et al. | |
| 7,079,703 B2 | 7/2006 | Kriss | |
| 7,136,538 B2 | 11/2006 | Kitagawa | |
| 7,215,823 B2 | 5/2007 | Miura et al. | |
| 7,346,226 B2 | 3/2008 | Shyshkin | |
| 7,352,916 B2 | 4/2008 | Estevez et al. | |
| 7,362,810 B2 | 4/2008 | Wang | |
| 7,415,163 B2 | 8/2008 | Nishi et al. | |
| 7,426,313 B2 | 9/2008 | Shohdohji | |
| 7,430,337 B2 | 9/2008 | Deshpande et al. | |
| 7,432,986 B2 | 10/2008 | Winger | |
| 7,440,635 B2 | 10/2008 | Tan et al. | |
| 7,471,845 B2 | 12/2008 | Deshpande | |
| 7,502,414 B2 | 3/2009 | Sugiyama et al. | |
| 7,590,288 B1 * | 9/2009 | Alvarez et al. | 382/199 |
| 2003/0053541 A1 | 3/2003 | Sun et al. | |
| 2005/0135559 A1 * | 6/2005 | Hermann Claus | 378/91 |
| 2006/0147095 A1 * | 7/2006 | Usher et al. | 382/117 |
| 2008/0175512 A1 | 7/2008 | Ohira | |

OTHER PUBLICATIONS

Segall and Katsaggelos, "Pre- and Post-Processing Algorithms for Compressed Video Enhancement," Proceedings of the Asilomar Conference on Signals and Systems, Oct. 2000, pp. 1369-1373, USA.
Kaup, "Reduction of Ringing Noise in Transform Image Coding Using a Simple Adaptive Filter," Electronic Letters, Oct. 1998, pp. 2110-2112, vol. 34, No. 22. Yang, Hu, Nguyen and Tull, "Maximum-Likelihood Parameter Estimation for Image Ringing-Artifact Removal," IEEE Transactions on Circuits and Systems for Video Technology, Aug. 2001, pp. 963-973, vol. 11, No. 8, IEEE, USA.
Yang and Galatsanos, "Removal of Compression Artifacts Using Projections onto Convex Sets and Line Process Modeling," IEEE Transactions on Image Processing, Oct. 1997, pp. 1345-1357, vol. 6, No. 10, IEEE, USA.
International Search Report—International Application No. PCT/JP2010/050580—Mailing Date Apr. 6, 2010.

* cited by examiner

*Primary Examiner* — Gregory F Cunningham
(74) *Attorney, Agent, or Firm* — Kristine Elizabeth Matthews; David C. Ripma (57) ABSTRACT

Aspects of the present invention are related to systems and methods for reducing compression artifacts. Decoded and displayed images and videos that have been compressed may exhibit visually objectionable artifacts. Aspects of the present invention relate to methods and systems for reducing visible artifacts by selectively filtering an image region based on a combination of a motion indicator and an edge-strength indicator.

27 Claims, 5 Drawing Sheets

METHODS AND SYSTEMS FOR REDUCING COMPRESSION ARTIFACTS

FIELD OF THE INVENTION

Embodiments of the present invention relate generally to image processing and, in particular, to methods and systems for reducing compression artifacts.

BACKGROUND

A digital image or a digital video sequence may be compressed by a compression algorithm in order to satisfy a bandwidth requirement of a transmission medium by which the image or sequence is to be communicated or to satisfy a storage-size limitation associated with a storage medium on which the image or sequence is to be stored. Exemplary, widely used, video-compression methods include MPEG-1, MPEG2, H.264 and other video-compression methods. Many video compression methods are DCT (Discrete Cosine Transform) based and may represent a signal by the sum of smooth, oscillating waves. When bandwidth or storage is insufficient, necessitating high compression ratios, decoded and displayed, or printed, images and videos may exhibit annoying ringing artifacts. Ringing artifacts may be caused by the fundamental inability of DCT-based compression algorithms to accurately represent edges, often making ringing artifacts more visible in the regions of text, diagrams, line drawings and other regions where strong, sharp edges are prominent. In video, some ringing artifacts may not always be visible. Ringing artifacts around stationary or slow-moving objects may be more visually objectionable than those near fast-moving objects. This may be due to the ability of the human visual system to better track objects with slow, or no motion, than objects with fast motion.

Some methods for de-ringing may be designed for use in a decoding loop or may assume knowledge of a decoding process. While such methods may take advantage of information in the codec (coder/decoder), these methods cannot be used in post-processing after decoding. Post-processing after decoding may be necessary because, in practice, ringing artifacts that may not be visible in the output of the codec may become visible after signal processing, for example, enhancement, up-scaling and other signal processing, is applied to the decoded image or video.

Methods and systems for post-processing de-ringing may be desirable.

SUMMARY

Some embodiments of the present invention comprise methods and systems for reducing artifacts in a digital image.

In some embodiments of the present invention, a motion analyzer may determine a motion indicator associated with a pixel location in an image. An edge analyzer may determine an edge-strength indicator associated with the pixel location, and the motion indicator and the edge-strength indicator may be combined to effectuate filtering at the pixel location when the combination meets a first criterion.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

A digital image or a digital video sequence may be compressed by a compression algorithm in order to satisfy a bandwidth requirement of a transmission medium by which the image or sequence is to be communicated or to satisfy a storage-size limitation associated with a storage medium on which the image or sequence is to be stored. Exemplary, widely used, video-compression methods include MPEG-1, MPEG2, H.264 and other video-compression methods. Many video compression methods are DCT (Discrete Cosine Transform) based and may represent a signal by the sum of smooth, oscillating waves. When bandwidth or storage is insufficient, necessitating high compression ratios, decoded and displayed, or printed, images and videos may exhibit annoying ringing artifacts. Ringing artifacts may be caused by the fundamental inability of DCT-based compression algorithms to accurately represent edges, often making ringing artifacts more visible in the regions of text, diagrams, line drawings and other regions where strong, sharp edges are prominent. In video, some ringing artifacts may not always be visible. Ringing artifacts around stationary or slow-moving objects may be more visually objectionable than those near fast-moving objects. This may be due to the ability of the human visual system to better track objects with slow, or no motion, than objects with fast motion.

Some methods for de-ringing may be designed for use in a decoding loop or may assume knowledge of a decoding process. While such methods may take advantage of information in the codec (coder/decoder), these methods cannot be used in post-processing after decoding. Post-processing after decoding may be necessary because, in practice, ringing artifacts that may not be visible in the output of the codec may become visible after signal processing, for example, enhancement, up-scaling and other signal processing, is applied to the decoded image or video.

Methods and systems for post-processing de-ringing may be desirable.

Figure 1:
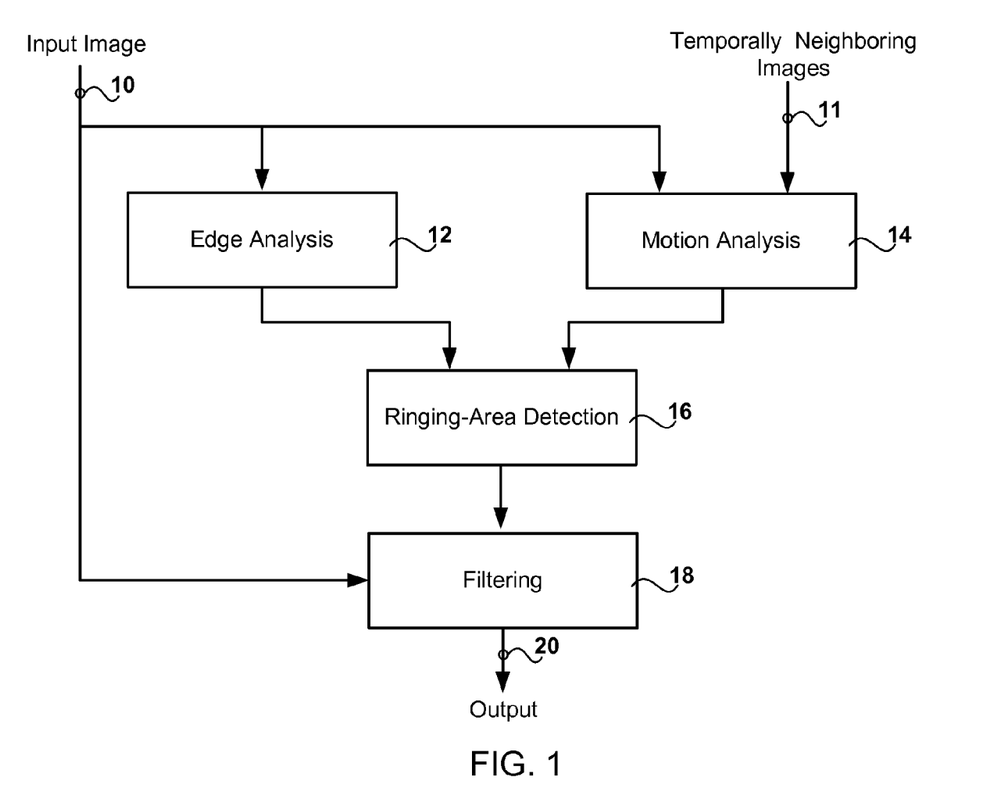
FIG. 1 is a chart showing exemplary embodiments of the present invention comprising filtering an image region based on a combination of edge analysis results and motion analysis results.

Exemplary embodiments of the present invention may be described in relation to FIG. 1. In these exemplary embodiments, an input image 10 from a video sequence and temporally neighboring images 11 from the video sequence may be processed in a computing system. Edge analysis 12 may performed on the input image 10. Edge analysis 12 may comprise identification, in the input image 10, of image areas near strong image edges. In some embodiments, edge analysis 12 may comprise calculation of an edge-strength indicator at each pixel in the input image 10. In alternative embodiments, edge analysis 12 may comprise, at each pixel in the input image 10, calculation of a local average of the edge strength values associated with the pixels in a neighborhood proximate to the pixel under consideration. Motion analysis 14 may be performed on the input image 10 and temporally neighboring images 11. Motion analysis 14 may comprise identification, in the input image 10, of image areas that are stationary or slowly changing with respect to the temporally neighboring images 11. The results of the edge analysis 12 and the motion analysis 14 may be combined in ringing-area detection 16 to identify areas, in the input image 10, comprising both strong edges and stationary, or slow motion. The input image 10 may be filtered 18 by a smoothing filter, where the strength of the smoothing filter may be controlled by the outcome of the ringing-area detection 16, to produce an output image 20 that exhibits fewer visible artifacts.

Figure 2:
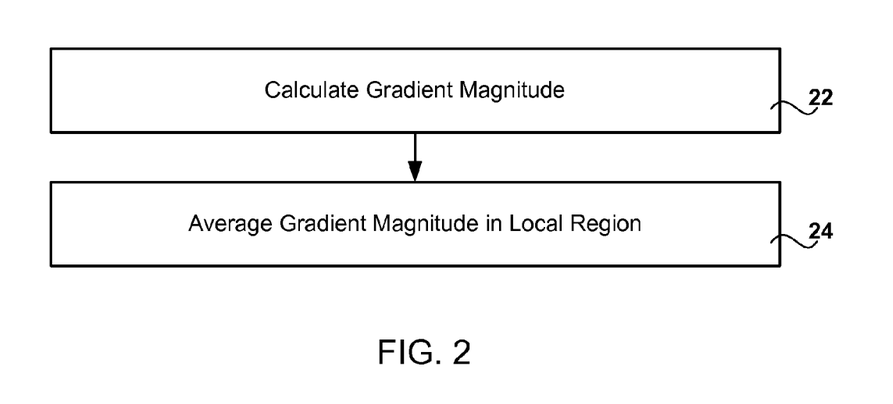
FIG. 2 is a chart showing exemplary embodiments of the present invention comprising edge-strength determination based on an average of gradient magnitudes in a local image region.

In some embodiments of the present invention described in relation to FIG. 1 and FIG. 2, edge analysis 12 may comprise identification of a strong image edge and identification of an image region substantially proximate to the strong image edge. In some embodiments, areas within approximately one transform-block size from a strong image edge may be identified, where the transform block size is the size of the transform used in the compression. A measure of edge strength at a pixel, which may be denoted $E_{i,j}$ for a pixel at location (i, j) in an image, may be computed by calculating 22 a gradient magnitude at the pixel. In some embodiments of the present invention, the gradient magnitude may be calculated using a Canny edge detector. In alternative embodiments of the present invention other edge detectors may be used. Exemplary edge detectors include a Roberts Cross edge detector, a Prewitt edge detector, a Sobel edge detector, a Rothwell edge detector, a Laplacian-of-Gaussian edge detector, a Laplace edge detector and other edge detectors known in the art. In some embodiments of the present invention, edge strength values may be averaged 24 in an analysis window centered at the pixel location (i, j) to produce a local-region average edge strength at the center pixel location. The average edge strength, also considered the edge-strength indicator, associated with a pixel location (i, j) may be denoted $ES_{i,j}$. In some embodiments of the present invention, the size of the analysis window may be related to the transform block size used in the compression. In alternative embodiments of the present invention, the size of the analysis window may be a preset default value. In some embodiments wherein the size of the analysis window is related to the transform block size used in the compression, the size of the analysis window may be approximately twice the transform block size. In some embodiments of the present invention where a variable block-size transform is used in the compression, the size of the analysis window may be related to the largest transform block size. In some embodiments of the present invention where the transform block size is unknown or unavailable, a default analysis window size of 8 may be used.

Transform size information may be obtained from the type of compression involved, which may available on a system level, and knowledge of the video decoding process for a bitstream associated with the image sequence being post-processed is not required.

Motion analysis 14 may comprise identification of areas in the input image 10 where there is little or no change in relation to temporally neighboring images. In some embodiments of the present invention, motion analysis 14 may comprise motion estimation according to any of the well-known motion-estimation techniques known in the art. In these embodiments, a motion vector, which may be denoted $m_{i,j,k} = [v_{i,j,k}, u_{i,j,k}]^T$, may be estimated at each pixel location (i, j) in the input image 10 associated with a temporal location, t, in the sequence. The motion vector at a pixel location may measure the spatial displacement between the pixel location $(i+v_{i,j,k}, j+u_{i,j,k}, t+k)$ and the pixel location (i,j,t), where the third index indicates the temporal relationship between the input image 10 and a temporally neighboring image. In some embodiments, a motion indicator, which may be denoted $MI_{i,j}$, may be calculated according to $MI_{i,j} = \|m_{i,j,k}\|$, where $\|\cdot\|$ indicates a vector norm, for example, the $L^1$ norm, the $L^2$ norm, the $L^P$ norm, the $L^\infty$ norm and any other vector norm. In some embodiments, multiple motion vectors may be available, and the motion indicator may be a combination of the multiple motion vectors. In some embodiments of the present invention, four motion vectors may be used to determine a motion indicator at a pixel. In some of these embodiments, motion vectors for two prior image frames and two later image frames may be used. In some embodiments of the present invention, the number and/or selection of neighboring image frames used in the determination of a motion indicator may be based on a trade-off between resources and performance. In one exemplary embodiment, multiple motion vectors may be averaged according to $$MI_{i,j} = \frac{1}{K}\sum_{k} \|m_{i,j,k}\|,$$

where K is the number of motion vectors, to form the motion indicator. In alternative embodiments, a weighted average of the motion vectors may be used to form a motion indicator. In some of these embodiments, the weight may be related to the temporal distance of a neighboring image from the input image 10.

In alternative embodiments of the present invention, motion analysis 14 may comprise motion detection according to any of the well-known motion-detection techniques known in the art. In these embodiments, a motion indicator, $MI_{i,j}$, may be have a value associated with the likelihood of motion determined by the motion detection. In some embodiments, a lower value may indicate a high likelihood of no, or little, motion.

Ringing-area detection 16 may combine the outcome of edge analysis 12 and motion analysis 14 to identify areas in the input image 10 that may be close to a strong edge and may be associated with little, or no, motion. In an exemplary embodiment, a binary indicator may be determined according to:

$$R_{i,j} = \begin{cases} 1 & \text{if } MI_{i,j} < th1 \text{ \& } ES_{i,j} > th2 \\ 0 & \text{otherwise,} \end{cases}$$

where $R_{i,j}$ indicates that the location (i, j) may be in a ringing area when $R_{i,j}=1$ and may not be in a ringing area when $R_{i,j}=0$, and th1 and th2 are predetermined threshold values. In alternative embodiments, a linear combination of the edge-strength indicator and the motion indicator may be used to determine a ringing-area indictor. In these embodiments, the ringing-area indicator may be formed according to:

$$R_{i,j} = aMI_{i,j} + bES_{i,j}.$$

A person of ordinary skill in the art will recognize there are many ways of combining the edge-strength indicator and the motion indicator to form a ringing-area indicator.

A de-ringing filter may be applied 18 to the input image 10 to filter out ringing artifacts. Some embodiments of the present invention described in relation to FIG. 3 may comprise a filter that is controlled by the ringing-area indicator. In these embodiments, a determination may be made 30 as to whether or not a pixel belongs to a ringing area. The determination may be based on the value of the ringing-area indicator, $R_{i,j}$, associated with the pixel. In some embodiments, the value of the ringing-area indictor may be compared to a threshold to determine if the pixel belongs to a ringing area. If the pixel does not belong 31 to a ringing area, then a determination may be made 32 as to whether or not there remain unfiltered pixels. If there are no unfiltered pixels remaining 33, then the filtering process may terminate 34. If there are unfiltered pixels remaining 35, then the next pixel data may be obtained 36 and further examined 30.

Figure 3:
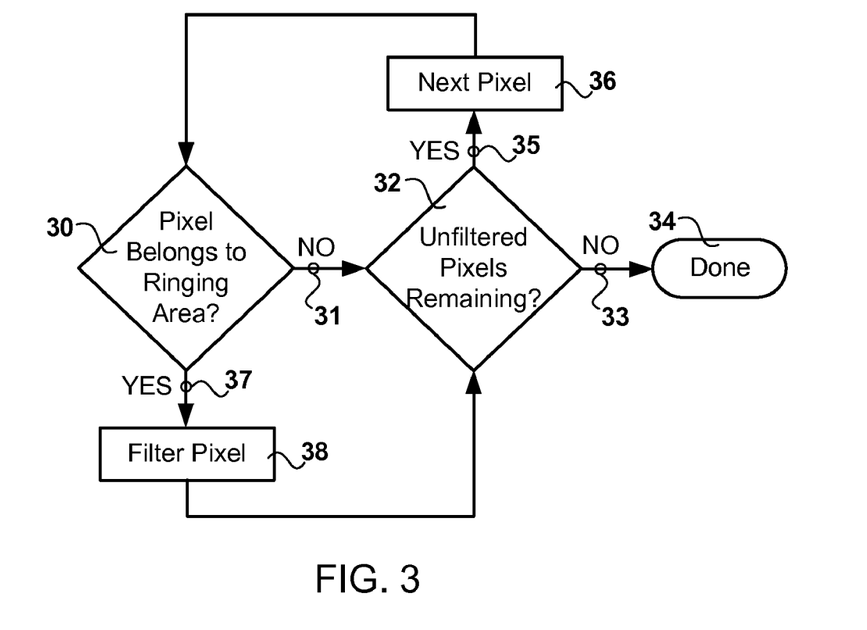
FIG. 3 is a chart showing exemplary embodiments of the present invention comprising filtering a pixel in an input image when the pixel is determined to be located in an area of the image likely to exhibit visually objectionable compression artifacts.

If the pixel does belong 37 to a ringing area, then the pixel may be filtered 38. In some embodiments of the present invention, a two-dimensional, spatial-only filter may be used. In alternative embodiments, a three-dimensional, spatio-temporal filter may be used, for example, a three-dimensional bilateral filter or other spatio-temporal filter. In an exemplary embodiment, a two-dimensional bilateral filter may be used. In this exemplary embodiment, the filtered output at a pixel location (i, j) may be determined according to:

$$O(i,j) = \frac{\sum_{-L \leq m,n \leq L} W(i,j,m,n)I(i-m,j-n)}{\sum_{-L \leq m,n \leq L} W(i,j,m,n)},$$

where I(i, j) denotes image intensity and $$W(i,j,m,n) = \exp\left(-\frac{m^2+n^2}{2\sigma_s^2}\right)\exp\left(-\frac{(I(i,j)-I(i-m,j-n))^2}{2\sigma_r^2}\right),$$

where $\sigma_r$ and $\sigma_s$ denote the bilateral filter parameters and L is associated with the filter support. In an exemplary embodiment, $\sigma_r=15$, $\sigma_s=2$ and L=3. After filtering 38, a determination may be made 32 as to whether or not there remain unfiltered pixels. If there are no unfiltered pixels remaining 33, then the filtering process may terminate 34. If there are unfiltered pixels remaining 35, then the next pixel data may be obtained 36 and further examined 30.

Figure 4:
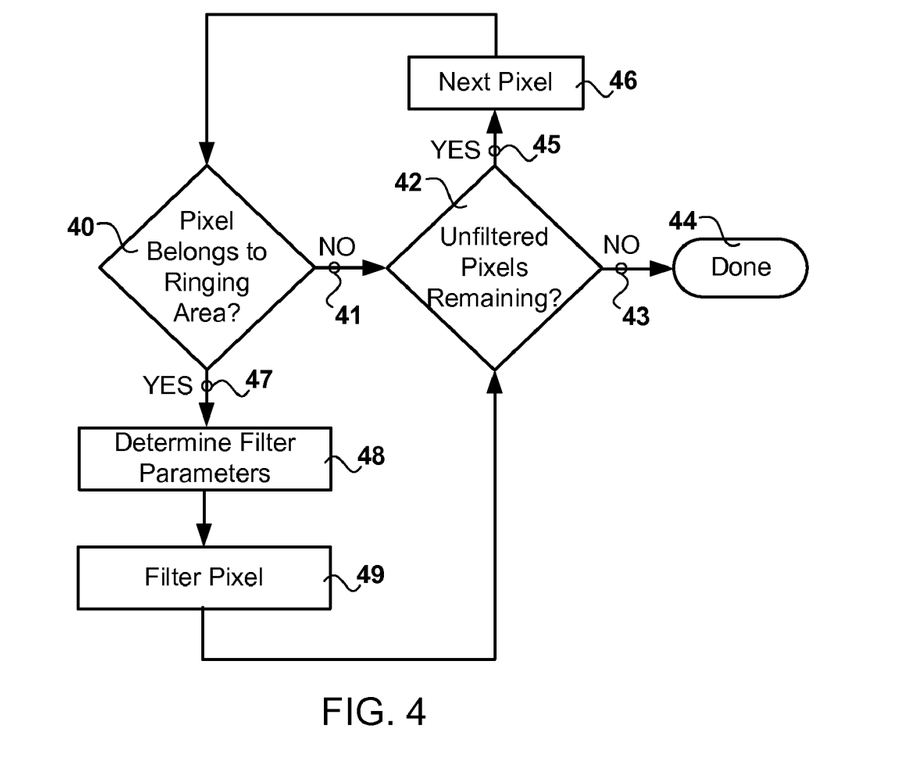
FIG. 4 is a chart showing exemplary embodiments of the present invention comprising filtering a pixel in an input image when the pixel is determined to be located in an area of the image likely to exhibit visually objectionable compression artifacts.

In alternative embodiments described in relation to FIG. 4, a determination may be made 40 as to whether or not a pixel belongs to a ringing area. The determination may be based on the value of the ringing-area indicator, $R_{i,j}$, associated with the pixel. In some embodiments, the value of the ringing-area indictor may be compared to a threshold to determine if the pixel belongs to a ringing area. If the pixel does not belong 41 to a ringing area, then a determination may be made 42 as to whether or not there remain unfiltered pixels. If there are no unfiltered pixels remaining 43, then the filtering process may terminate 44. If there are unfiltered pixels remaining 45, then the next pixel data may be obtained 46 and further examined 40.

If the pixel does belong 47 to a ringing area, then filter parameters may be determined 48, and the pixel may be filtered 49. In some embodiments of the present invention, a two-dimensional, spatial-only filter may be used. In alternative embodiments, a three-dimensional, spatio-temporal filter may be used, for example, a three-dimensional bilateral filter or other spatio-temporal filter. In an exemplary embodiment, a two-dimensional bilateral filter may be used. In this exemplary embodiment, the filtered output at a pixel location (i, j) may be determined according to:

$$O(i,j) = \frac{\sum_{-L \leq m,n \leq L} W(i,j,m,n)I(i-m,j-n)}{\sum_{-L \leq m,n \leq L} W(i,j,m,n)},$$

where I(i, j) denotes image intensity and $$W(i,j,m,n) = \exp\left(-\frac{m^2+n^2}{2\sigma_s^2(R_{i,j})}\right)\exp\left(-\frac{(I(i,j)-I(i-m,j-n))^2}{2\sigma_r^2(R_{i,j})}\right),$$

where L is associated with the filter support and $\sigma_r(R_{i,j})$ and $\sigma_s(R_{i,j})$ denote the bilateral filter parameters which depend on $R_{i,j}$ and may be determined 48 for each pixel. In an exemplary embodiment, when $R_{i,j}$ indicates a ringing area, the parameters may be set according to $\sigma_r(\text{ringing})=20$, $\sigma_s(\text{ringing})=4$ and $L(\text{ringing})=8$, and when $R_{i,j}$ indicates a non-ringing area, the parameters may be set according to $\sigma_r(\text{non-ringing})=10$, $\sigma_s(\text{non-ringing})=2$ and $L(\text{non-ringing})=4$. In some embodiments, the filter parameters may be linearly scaled by $R_{i,j}$. In alternative embodiments, the filter parameters may be non-linearly scaled by $R_{i,j}$. After filtering 49, a determination may be made 42 as to whether or not there remain unfiltered pixels. If there are no unfiltered pixels remaining 43, then the filtering process may terminate 44. If there are unfiltered pixels remaining 45, then the next pixel data may be obtained 46 and further examined 40.

In alternative embodiments, a first filter with a first default set of parameters may be used when a pixel is not part of a ringing area, and a second filter with a second default set of parameters may be used when the pixel is part of a ringing area. In some embodiments, the second filter parameters may effectuate more aggressive smoothing. Some of these embodiments may be described in relation to FIG. 5. In these embodiments, a determination may be made 50 as to whether or not a pixel belongs to a ringing area. The determination may be based on the value of the ringing-area indicator, $R_{i,j}$, associated with the pixel. In some embodiments, the value of the ringing-area indictor may be compared to a threshold to determine if the pixel belongs to a ringing area. If the pixel does 51 belong to a ringing area, the pixel may be filtered with a first filter 52, and if the pixel does not 53 belong to a ringing area, the pixel may be filtered with a second filter 54. After filtering 52, 54, a determination may be made 56 as to whether or not there remain unfiltered pixels. If there are no unfiltered pixels remaining 57, then the filtering process may terminate 58. If there are unfiltered pixels remaining 59, then the next pixel data may be obtained 60 and further examined 50.

Figure 5:
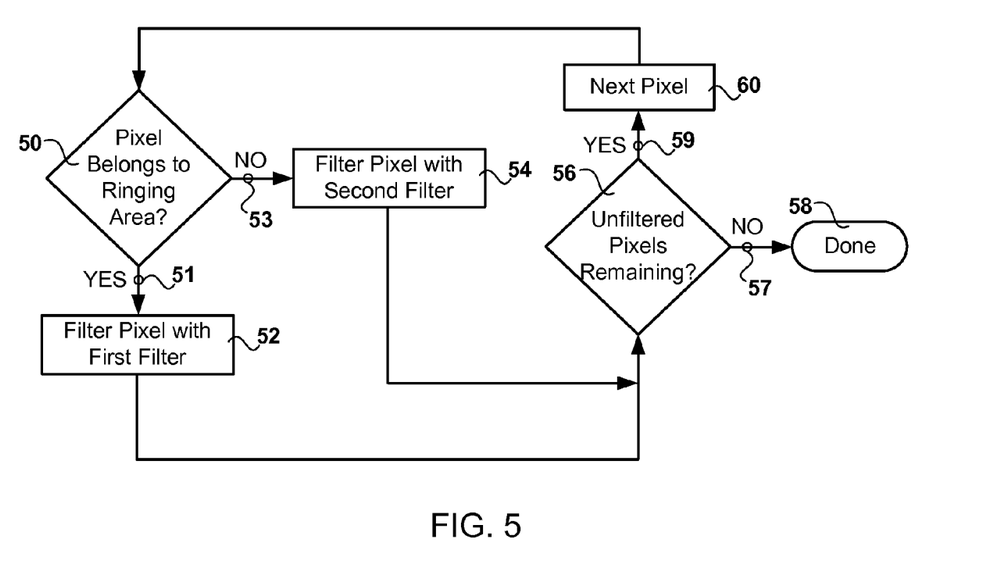
FIG. 5 is a chart showing exemplary embodiments of the present invention comprising determination of whether or not a pixel is located in an area of the image likely to exhibit visually objectionable compression artifacts and filtering the pixel according to the determination.

In some embodiments of the present invention, the first filter may comprise a two-dimensional, spatial-only filter. In alternative embodiments, a three-dimensional, spatio-temporal filter may be used for the first filter, for example, a three-dimensional bilateral filter or other spatio-temporal filter. In an exemplary embodiment, the first filter may comprise a two-dimensional bilateral filter. In this exemplary embodiment, the first-filter filtered output at a pixel location (i, j) may be determined according to:

$$O(i, j) = \frac{\sum_{-L1 \leq m,n \leq L1} W(i, j, m, n) I(i-m, j-n)}{\sum_{-L1 \leq m,n \leq L1} W(i, j, m, n)},$$

where I(i, j) denotes image intensity and $$W(i, j, m, n) = \exp\left(-\frac{m^2+n^2}{2\sigma_{s1}^2}\right) \exp\left(-\frac{(I(i,j) - I(i-m, j-n))^2}{2\sigma_{r1}^2}\right),$$

where $\sigma_{r1}$ and $\sigma_{s1}$ denote the bilateral filter parameters associated with the first filter and L1 denotes the support of the first filter.

In some embodiments of the present invention, the second filter may comprise a two-dimensional, spatial-only filter. In alternative embodiments, a three-dimensional, spatio-temporal filter may be used for the second filter, for example, a three-dimensional bilateral filter or other spatio-temporal filter. In an exemplary embodiment, the second filter may comprise a two-dimensional bilateral filter. In this exemplary embodiment, the second-filter filtered output at a pixel location (i, j) may be determined according to:

$$O(i, j) = \frac{\sum_{-L2 \leq m,n \leq L2} W(i, j, m, n) I(i-m, j-n)}{\sum_{-L2 \leq m,n \leq L2} W(i, j, m, n)},$$

where I(i, j) denotes image intensity and $$W(i, j, m, n) = \exp\left(-\frac{m^2+n^2}{2\sigma_{s2}^2}\right) \exp\left(-\frac{(I(i,j) - I(i-m, j-n))^2}{2\sigma_{r2}^2}\right),$$

where $\sigma_{r2}$ and $\sigma_{s2}$ denote the bilateral filter parameters associated with the second filter and L2 denotes the support of the second filter.

In yet alternative embodiments, a first filter with a first default set of parameters may be used when a pixel is not part of a ringing area, and a second filter with a second default set of parameters may be used when the pixel is part of a ringing area. In some embodiments, the first filter parameters and/or the second filter parameters may be determined based on the ringing-area indicator. In some embodiments, the second filter parameters may effectuate more aggressive smoothing. Some of these embodiments may be described in relation to FIG. 6. In these embodiments, a determination may be made 70 as to whether or not a pixel belongs to a ringing area. The determination may be based on the value of the ringing-area indicator, $R_{i,j}$, associated with the pixel. In some embodiments, the value of the ringing-area indictor may be compared to a threshold to determine if the pixel belongs to a ringing area. If the pixel does 71 belong to a ringing area, filter parameters associated with a first filter may be determined 72, and the pixel may be filtered with the first filter 74. If the pixel does not 75 belong to a ringing area, filter parameters associated a second filter may be determined 76, and the pixel may be filtered with the second filter 78. After filtering 74, 48, a determination may be made 80 as to whether or not there remain unfiltered pixels. If there are no unfiltered pixels remaining 81, then the filtering process may terminate 82. If there are unfiltered pixels remaining 83, then the next pixel data may be obtained 84 and further examined 70.

Figure 6:
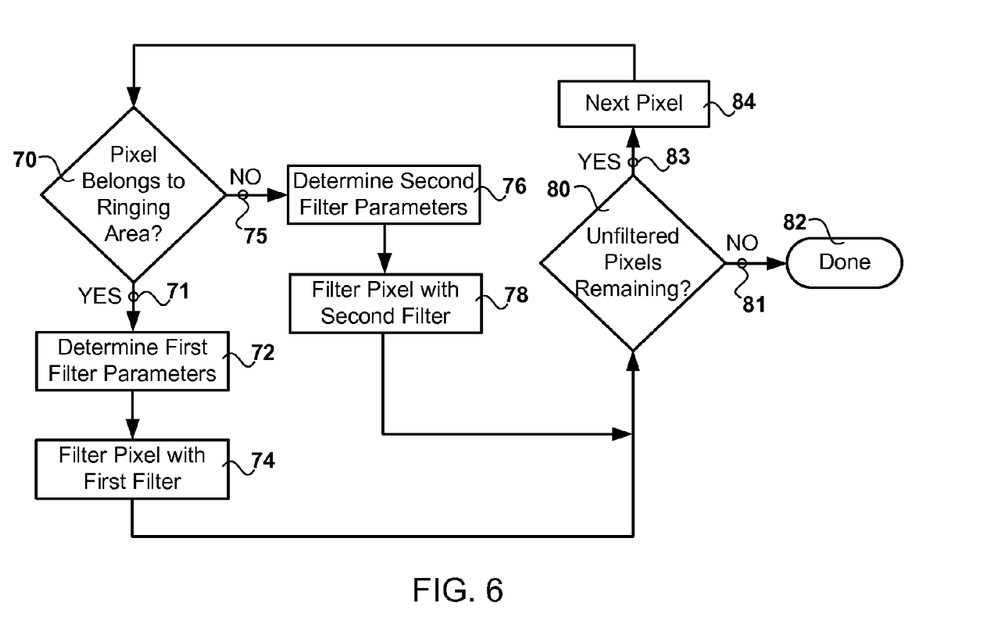
FIG. 6 is a chart showing exemplary embodiments of the present invention comprising determination of whether or not a pixel is located in an area of the image likely to exhibit visually objectionable compression artifacts and filtering the pixel according to the determination.

In some embodiments of the present invention, the first filter may comprise a two-dimensional, spatial-only filter. In alternative embodiments, a three-dimensional, spatio-temporal filter may be used for the first filter, for example, a three-dimensional bilateral filter or other spatio-temporal filter. In an exemplary embodiment, the first filter may comprise a two-dimensional bilateral filter. In this exemplary embodiment, the first-filter filtered output at a pixel location (i, j) may be determined according to:

$$O(i, j) = \frac{\sum_{-L1 \leq m,n \leq L1} W(i, j, m, n) I(i-m, j-n)}{\sum_{-L1 \leq m,n \leq L1} W(i, j, m, n)},$$

where I(i, j) denotes image intensity and $$W(i, j, m, n) = \exp\left(-\frac{m^2 + n^2}{2\sigma_{s1}^2(R_{i,j})}\right)\exp\left(-\frac{(I(i, j) - I(i - m, j - n))^2}{2\sigma_{r1}^2(R_{i,j})}\right),$$

where $\sigma_{r1}(R_{i,j})$ and $\sigma_{s1}(R_{i,j})$ denote the bilateral filter parameters associated with the first filter and L1 denotes the support of the first filter. In some embodiments, the filter parameters may be linearly scaled by $R_{i,j}$. In alternative embodiments, the filter parameters may be non-linearly scaled by $R_{i,j}$.

In some embodiments of the present invention, the second filter may comprise a two-dimensional, spatial-only filter. In alternative embodiments, a three-dimensional, spatio-temporal filter may be used for the second filter, for example, a three-dimensional bilateral filter or other spatio-temporal filter. In an exemplary embodiment, the second filter may comprise a two-dimensional bilateral filter. In this exemplary embodiment, the second-filter filtered output at a pixel location (i, j) may be determined according to:

$$O(i, j) = \frac{\sum_{-L2 \le m,n \le L2} W(i, j, m, n) I(i - m, j - n)}{\sum_{-L2 \le m,n \le L2} W(i, j, m, n)},$$

where I(i, j) denotes image intensity and $$W(i, j, m, n) = \exp\left(-\frac{m^2 + n^2}{2\sigma_{s2}^2(R_{i,j})}\right)\exp\left(-\frac{(I(i, j) - I(i - m, j - n))^2}{2\sigma_{r2}^2(R_{i,j})}\right),$$

where $\sigma_{r2}(R_{i,j})$ and $\sigma_{s2}(R_{i,j})$ denote the bilateral filter parameters associated with the second filter and L2 denotes the support of the first filter. In some embodiments, the filter parameters may be linearly scaled by $R_{i,j}$. In alternative embodiments, the filter parameters may be non-linearly scaled by $R_{i,j}$.

Figure 7:
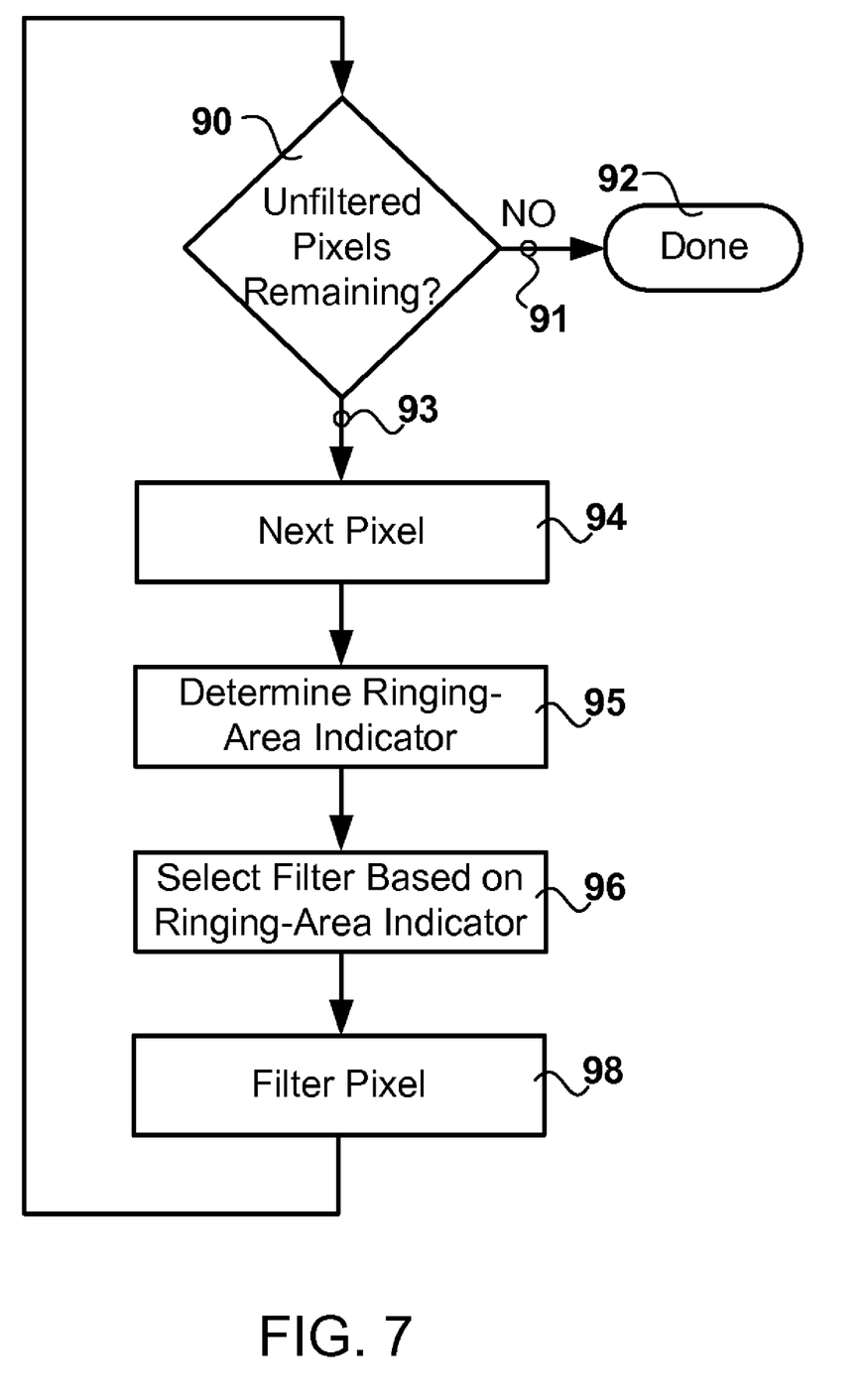
FIG. 7 is a chart showing exemplary embodiments of the present invention comprising pixel filtering using a switchable filter with multiple states, wherein the state of the switchable filter is selected based on a ringing-area indicator.

In still alternative embodiments of the present invention, pixel filtering may comprise a switchable filter with multiple states. These embodiments may be understood in relation to FIG. 7. A determination may be made 90 as to whether or not there remain unfiltered pixels. If there are no unfiltered pixels 91, then the filtering process may terminate 92. If there are unfiltered pixels 93, then the data associated with the next pixel may be obtained 94. A ringing-area indicator associated with the pixel may be determined 95. A filter state may be selected 96 based on the value of the ringing-area indicator associated with the pixel. In some embodiments, a filter state may be associated with a range of ringing-area indicator values. The pixel may be filtered 98 according to a filter set to the selected state. In some exemplary embodiments, the filter state may be associated with the parameters of a two-dimensional bilateral filter. In these embodiments, the filter output at pixel location (i, j) may be determined according to:

$$O(i, j) = \frac{\sum_{-L \le m,n \le L} W(i, j, m, n) I(i - m, j - n)}{\sum_{-L \le m,n \le L} W(i, j, m, n)},$$

where I(i, j) denotes image intensity and $$W(i, j, m, n) = \exp\left(-\frac{m^2 + n^2}{2\sigma_s^2(\gamma)}\right)\exp\left(-\frac{(I(i, j) - I(i - m, j - n))^2}{2\sigma_r^2(\gamma)}\right),$$

where $\sigma_{r1}(\gamma)$ and $\sigma_{s1}(\gamma)$ denote the bilateral filter parameters associated with a state, denoted $\gamma$, where $\gamma$ may map to an interval of $R_{i,j}$ values.

In some embodiments of the present invention comprising a bilateral filter of the form:

$$O(i, j) = \frac{\sum_{-L \le m,n \le L} W(i, j, m, n) I(i - m, j - n)}{\sum_{-L \le m,n \le L} W(i, j, m, n)},$$

where I(i, j) denotes image intensity and $$W(i, j, m, n) = \exp\left(-\frac{m^2 + n^2}{2\sigma_s^2}\right)\exp\left(-\frac{(I(i, j) - I(i - m, j - n))^2}{2\sigma_r^2}\right),$$

where $\sigma_r$ and $\sigma_s$ denote the bilateral filter parameters and L denotes the filter support, the edge-strength measure may be calculated by summing the range kernel according to:

$$E_{i,j} = \sum_{-L \le m,n \le L} \exp\left(-\frac{(I(i, j) - I(i - m, j - n))^2}{2\sigma_r^2}\right).$$

In these embodiments, computational expense may be reduced.

Figure 8:
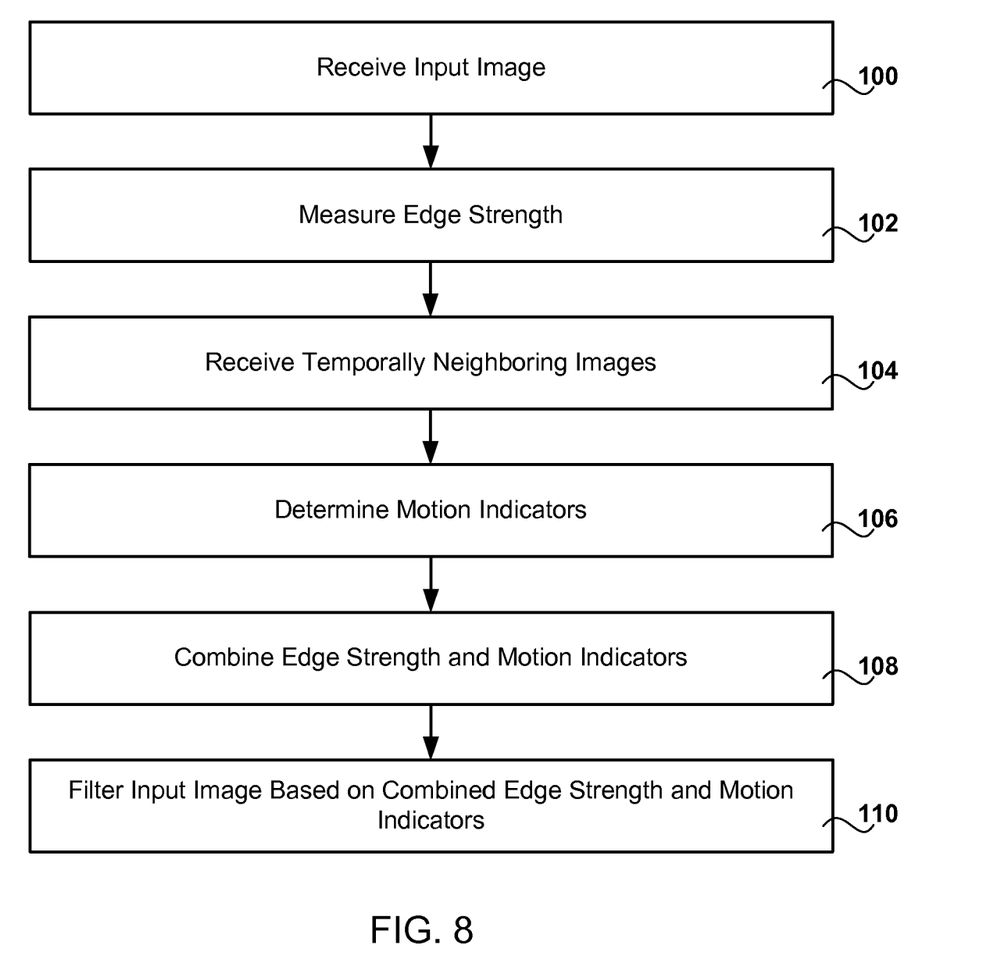
FIG. 8 is a chart showing exemplary embodiments of the present invention comprising image filtering based on a combination of an edge-strength indicator and a motion indicator.

Some embodiments of the present invention may be described in relation to FIG. 8. In these embodiments an input image from a video sequence may be received 100 in a computing system. The edge strength values may be measured 102 for the input image. Temporally neighboring images may be received 104, and motion indicators may be determined 106 for the input image and the temporally neighboring images. The edge strength values and the motion indicators may be combined 108 and the input image may be filtered 110 based on the combined edge strength values and motion indicators.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A system for removing artifacts from a digital image, said system comprising:
   a) a motion analyzer for determining a motion indicator associated with a pixel location in a digital image;
   b) an edge analyzer for determining an edge-strength indicator associated with said pixel location in said digital image; and
   c) a combiner for combining said motion indicator and said edge-strength indicator to effectuate filtering at said pixel location, wherein said filtering at said pixel location is based on said combination.

2. The system as described in claim 1, wherein said filtering at said pixel location comprises a bilateral filter.

3. The system as described in claim 2, wherein said edge analyzer comprises a range-kernel adder for summing a range kernel associated with said bilateral filter at said pixel location.

4. The system as described in claim 1, wherein said edge analyzer comprises:
   a) an edge detector for associating an edge-strength value with each pixel location in a first plurality of pixel locations proximate to said pixel location in said digital image; and
   b) an edge-strength-indicator associator for associating averaged edge-strength values with said pixel location.

5. The system as described in claim 4, wherein said first plurality of pixel locations are determined based on a transform size associated with a compression method associated with said digital image.

6. The system as described in claim 1, wherein said filtering at said pixel location comprises a first filter associated with a first set of filter parameter values.

7. The system as described in claim 6, wherein said first set of filter parameter values are based on said combination.

8. The system as described in claim 6, wherein said first filter is a filter selected from the group consisting of a two-dimensional bilateral filter, a three-dimensional bilateral filter, a spatial filter and a spatio-temporal filter.

9. The system as described in claim 1, wherein said motion analyzer comprises a motion estimator for measuring, between said digital image and a temporally neighboring image, a spatial displacement associated with said pixel location.

10. The system as described in claim 1, wherein said motion analyzer comprises a motion detector for detecting, between said digital image and a temporally neighboring image, a likelihood of motion associated with said pixel location.

11. The system as described in claim 1, wherein said edge analyzer comprises an edge detector.

12. The system as described in claim 11, wherein said edge detector is an edge detector selected from the group consisting of a Canny edge detector, a Sobel edge detector, a Roberts Cross edge detector, a Prewitt edge detector, a Rothwell edge detector, a Laplacian-of-Gaussian edge detector and a Laplace edge detector.

13. The system as described in claim 1, wherein said filtering at said pixel location comprises a first filtering at said pixel location when said combination meets a first criterion and a second filtering at said pixel location when said combination does not meet said first criterion.

14. The system as described in claim 13, wherein:
   a) said first filtering comprises a first filter associated with a first set of filter parameter values; and
   b) said second filtering comprises said first filter associated with a second set of filter parameter values.

15. The system as described in claim 14, wherein said first filter is a filter selected from the group consisting of a two-dimensional bilateral filter, a three-dimensional bilateral filter, a spatial filter and a spatio-temporal filter.

16. The system as described in claim 13, wherein said second filtering comprises a second filter.

17. The system as described in claim 16, wherein said second filter is a filter selected from the group consisting of a two-dimensional bilateral filter, a three-dimensional bilateral filter, a spatial filter and a spatio-temporal filter.

18. The system as described in claim 1, wherein said filtering at said pixel location comprises selecting one of a plurality of filters based on said combination.

19. The system as described in claim 1, wherein said filtering at said pixel location comprises selecting a set of filter parameters from a plurality of sets of filter parameters based on said combination.

20. A method for removing artifacts from a digital image, said method comprising:
   a) receiving, in a computing system, a digital image;
   b) determining an edge-strength indicator associated with a pixel location in said digital image;
   c) determining a motion indicator associated with said pixel location in said digital image;
   d) combining said edge-strength indicator and said motion indicator; and
   e) filtering said digital image at said pixel location based on said combination.

21. The method as described in claim 20, wherein said determining an edge-strength indicator comprises:
   a) for each pixel location in a region proximate to said pixel location, determining an edge-strength value associated with said each pixel location; and
   b) averaging said edge-strength values.

22. The method as described in claim 20, wherein said filtering comprises a filter selected from the group consisting of a two-dimensional bilateral filter, a three-dimensional bilateral filter, a spatial filter and a spatio-temporal filter.

23. The method as described in claim 20, wherein said edge-strength indicator is determined using a region based on a transform size associated with a compression method associated with said digital image.

24. The method as described in claim 20, wherein said filtering said digital image at said pixel location comprises selecting one of a plurality of filters based on said combination.

25. The method as described in claim 20, wherein said filtering said digital image at said pixel location comprises selecting a set of filter parameters from a plurality of sets of filter parameters based on said combination.

26. The method as described in claim 20, wherein said determining a motion indicator comprises measuring, between said digital image and a temporally neighboring image, a spatial displacement associated with said pixel location.

27. The method as described in claim 20, wherein said determining a motion indicator comprises detecting, between said digital image and a temporally neighboring image, a likelihood of motion associated with said pixel location.

* * * * *